Figure 1:
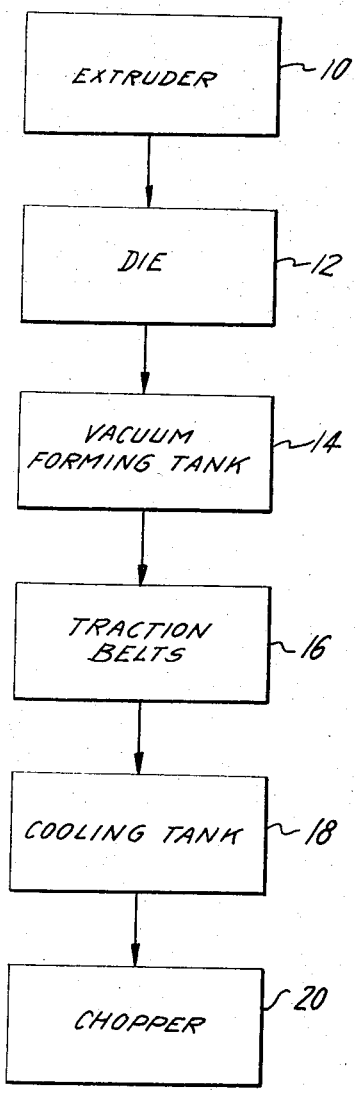
Figure 2:
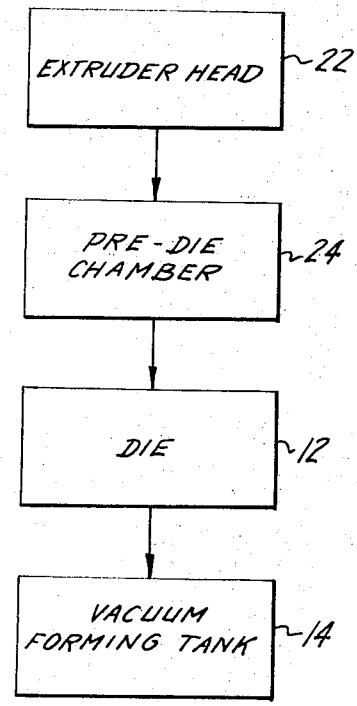
Figure 3:
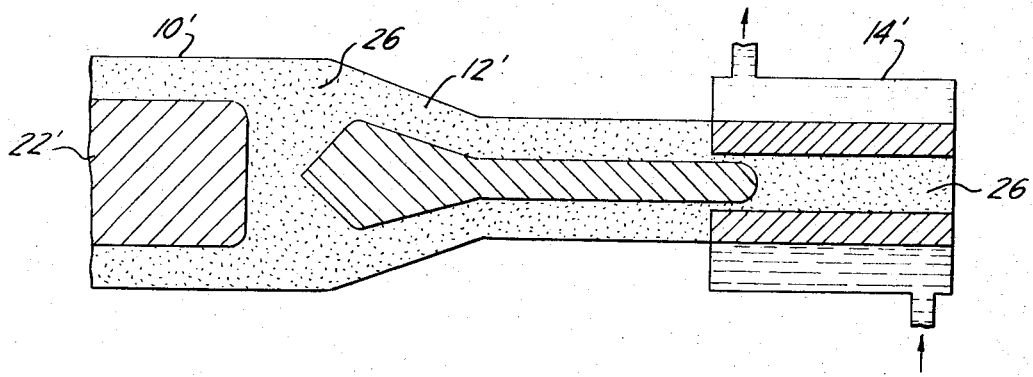
Figure 4:
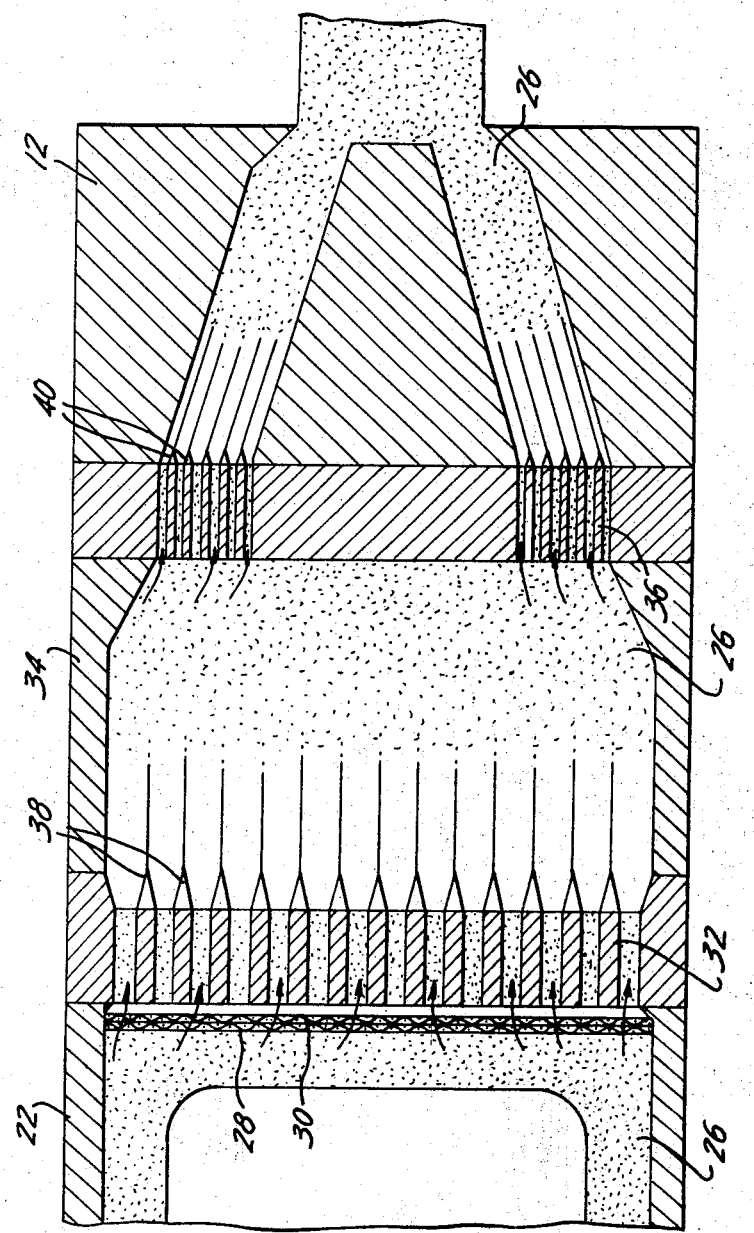

United States Patent [19]
Crystal

[11] 3,833,202
[45] Sept. 3, 1974

[54] PRE-DIE CHAMBER FOR EXTRUSION APPARATUS

[75] Inventor: Milton A. Crystal, Fort Lee, N.J.

[73] Assignee: American Polymers, Inc., Paterson, N.J.

[22] Filed: Dec. 7, 1972

[21] Appl. No.: 313,200

[52] U.S. Cl.................. 259/4, 259/185, 425/199
[51] Int. Cl............................................ B29b 1/04
[58] Field of Search......... 259/4, 18, 191, 192, 193; 425/197, 198, 199, 200

[56] References Cited
UNITED STATES PATENTS

| | | | |
|---|---|---|---|
| 2,815,532 | 12/1957 | Braunlich | 259/4 |
| 3,677,522 | 7/1972 | Hargash | 259/4 |
| 3,738,615 | 6/1973 | Brasie | 259/4 |

Primary Examiner—Robert W. Jenkins
Attorney, Agent, or Firm—Mel K. Silverman

[57] ABSTRACT

The present invention comprises a pre-die chamber for use in an extrusion system. The pre-die chamber is located immediately following the head of a conventional extruder. Following the pre-die chamber is a standard extrusion die. The structure of the pre-die chamber comprises a housing disposed longitudinally to the direction of extrusion. The housing exhibits a front end plate and a rear end plate. Both end plates comprise apertured transverse surfaces. In the case of the first surface, a screen and orifice combination of transverse members is utilized. The second surface is a single apertured plate having its apertures disposed transversely to the direction of extrusion. In addition, these apertures lie in the path of the die entrance.

Through the use of the present pre-dye chamber, extruded material that is passed therethrough will exhibit a cell structure bearing a high degree of similarity to that of natural wood.

9 Claims, 4 Drawing Figures

PRE-DIE CHAMBER FOR EXTRUSION APPARATUS

BACKGROUND OF THE INVENTION

The present invention constitutes a response to a long-standing problem in the extrusion industry. This problem is one of imparting a desired internal structure to the so-called extruded profile. More particularly, the problem can be viewed as one of obtaining a desired cell structure within a particular extruded material.

Cell structure is of the utmost importance because of its influence on the many of the physical properties of extruded material. For example, two materials may possess identical molecular compositions; however, due to differences of cell structure, the physical properties of the materials may differ greatly.

Most prior art attempts at obtaining particular cell structures have involved one of two approaches. The first approach is that of adjusting the various heat and pressure zones within the extruder. The second is that of using different dies and forming jigs. These prior art attempts (a good example of which appears in the patent to P. Boutillier, Canadian Pat. No. 882,818 (1971)) have failed to produce the types of cell structure for which the greatest need exists.

One type of cell structure that the extrusion industry has long sought to simulate is that of natural wood. While certain rough approximations have been achieved, nothing that could truly be termed a wood substitute has been produced.

It is towards the attainment of a suitable wood substitute that the present invention is primarily directed. It is, however, to be noted that the novel pre-die chamber presented herein may be utilized in the formation of any of a plurality of different cell structures.

SUMMARY OF THE INVENTION

An object of the present invention is to provide a pre-die chamber for use in the extrusion of cell-like material.

A further object is to supply a pre-die chamber for use in the extrusion of a wood substitute.

A yet further object is to supply an extrusion system that will modify the flow characteristics of extruded material as it leaves the extruder head, thereby changing the ultimate internal structure which the material will have after it has been cooled.

Still another object is to provide a pre-die chamber suitable for use with a plurality of different materials, and capable of producing a plurality of different cell structures.

The instant invention comprises a pre-die chamber having a housing disposed longitudinally to the direction of extrusion, a first end of said housing disposed proximate to the extruder head, said first end comprising an apertured transverse member, and a second end to said housing, said second end disposed proximate to the die entrance, said second end comprising a second apertured transverse member, wherein said apertures are disposed in the path of the die entrance.

BRIEF DESCRIPTION OF THE DRAWINGS

FIG. 1 is a flow diagram of a representative extrusion system.

FIG. 2 is a flow diagram of one section of a proposed extrusion system, showing the location of the present invention in said system.

FIG. 3 is a cross-sectional view of the prior art.

FIG. 4 is a cross-sectional view showing the present invention and its relationship to the adjacent extrusion sub-systems.

DETAILED DESCRIPTION OF THE INVENTION

The present invention can best be understood as a self-contained, integral sub-system of a total extrusion system. FIG. 1 is a flow diagram of an extrusion system that is representative of that class of systems in which the present invention might be utilized. The illustrated system comprises an extruder 10, a die 12, a vacuum-forming tank 14, traction belts 16 for advancing the extruded material, a cooling tank 18, and a chopper 20 for cutting the extruded material to the desired size.

An expanded flow diagram of one section of a proposed system appears in FIG. 2. Illustrated therein is an extruder head 22 and a pre-die chamber 24. Following the chamber 24 is the die 12, followed by the vacuum-forming tank 14.

It may be seen by comparison of FIG. 2 to FIG. 1 that the die chamber represents a new and novel addition to the prior art extrusion system. This fact is further illuminated in FIG. 3, which constitutes a cross-sectional view of a representative prior art extrusion system. One can readily observe that the extruded material 26 is forced through the extruder head 22' and directly into the die 12'. No intermediate apparatus separates the head 22' from the entrance to the die 12'. Accordingly, there can be no change in the internal structure of the extruded material as it enters the die 12. It may be noted that a minimal and insignificant change of internal structure may occur because of an increased pressure existant within the die itself. This factor is not, however, sufficiently significant to effect a structural change of importance.

FIG. 4, which is a detailed schematic of the flow diagram FIG. 2, illustrates the present pre-die chamber in cross-section. Elements 28 and 30 represent standard 12-and 24-mesh screens respectively. Element 32, which is disposed proximate to Element 30, is an apertured transverse member. Element 34 is a basically cylindrical chamber disposed longitudinally to the direction of extrusion. The element 34 is slightly tapered in the direction of extrusion. Element 36 is a second apertured transverse member wherein the apertures are disposed in the path of the die entrance.

The screens 28 and 30, in association with the apertured member 32, function to build up a pressure of about 1,000 psi in the material 26 within the extruder head 22. For purposes of the present discussion, the effect of this pressure can be viewed in two ways: Firstly, it serves to produce a uniform flow of material through the screens 28 and 30, and through the apertures of member 32. Secondly, the pressure, in combination with the function of the apertures, creates a multiplicity of logitudinal cavities 38 within the extruded material. The material will readily expand into said cavities as it advances through the chamber 34. It is the above sequence of pressure, cavity formation, and expansion, that contributes to the attainment of the desired cellular structure.

This process is essentially repeated as the extruded material passes through the second apertured member 36. A pressure, this time in the neighborhood of 1,200 psi, is again developed in front of the member 36. Longitudinal cavities 40 are formed, and the material 26 again expands into the cavities as the material passes through the die 12. The apertured member 36 performs the additional function of directing the material 26 into the die 12, thereby facilitating a smooth flow of the extruded material. The rate of this flow is generally between 15 and 20 feet per minute.

Materials suitable for use with the present pre-die chamber include ABS, PVC, polystyrene, polyethelyne, and polypropelene.

It is to be noted that screens 28 and 30 may comprise more than a simple two-screen combination, and may utilize mesh sizes other than 12 and 24. For example, a 6-mesh screen could easily be added to screens 28 and 30. Similarly, a single screen could be suitable to certain applications. In like fashion, it is completely possible that certain compositions could be utilized without the use of either screen 28 or 30.

The apertures in the first breaker plate 32 may range in diameter from 100 to 425 mils, with a preferable size being about 200 mils. Said apertures are roughly 10 times the diagonal length of a mesh square of the smallest screen mesh 30 that is used. Hence, the applicable range of mesh diagonals for the smallest screen mesh is between 10 mils and 43 mils.

The apertures in the second breaker plate 36 may range in diameter from about 40 to 250 mils, with the preferable size being about 100 mils.

The widths of the screens 28 and 30 each range between 40 and 160 mils. The width of the first plate 32 may range between 100 mils and 850 mils; and second plate 36, between 500 and 1,000 mils.

Plates 32 and 36 are preferably separated by between 1 and 5 inches. Finally, it is to be noted that the pre-die chamber of the preceding description is suitable to use with any extrusion system having an interface between an extruder head an a die.

It is thus seen that the objects set forth in the Summary of the Invention are among those sufficiently attained by the device of the preceding description.

We wish it to be understood that we do not desire to be limited to the exact details of construction shown in the drawings, described in the specification, or hereinafter claimed, for obvious modification will occur to persons skilled in the art.

I claim:

1. A pre-die chamber for extrusion apparatus, said chamber located intermediate between an extruder head and a die, said chamber comprising:
   a. a housing disposed longitudinal to the direction of extrusion;
   b. a first end of said housing disposed proximate to the extruder head, said first end comprising a first apertured transverse member;
   c. a second end to said housing disposed proximate to the die entrance, said second end comprising a second apertured transverse member, wherein said apertures lie in the path of the die entrance;
   d. a screen; and
   e. a breaker plate, disposed proximate to said screen, and subsequent to said screen with reference to the direction of extrusion,
   whereby extruded material having a desired cell structure is obtained through the use of said pre-die chamber.

2. The chamber as recited in claim 1 in which the ratio of the diameter of the apertures in said breaker plate to the diagonal of the apertures in said screen is about 10 to 1.

3. The chamber as recited in claim 1 in which said screen comprises a plurality of screens.

4. The chamber as recited in claim 3 in which the said screens are of respectively different meshes and sizes.

5. The chamber as recited in claim 4 in which said plurality of screens comprises a 12-mesh screen in combination with a 24-mesh screen; and said breaker plate exhibits apertures of about 200-mils.

6. The chamber as recited in claim 5 in which the mesh sizes of said screen range between 6 and 24.

7. The chamber as recited in claim 3 in which:
   said screens have a total width of between 0.04 and 0.16 inches;
   said breaker plate has a width of between 0.20 and 0.85 inches; and said second transverse member has a width of between one-half and 1 inches.

8. The chamber as recited in claim 1 in which the diameter of the apertures of the first breaker plate ranges between 100 and 450 mils.

9. The chamber as recited in claim 1 in which said breaker plate and said second transverse member are separated by a distance of between 1 and 5 inches.

* * * * *